(12) United States Patent
Kimura

(10) Patent No.: US 6,853,776 B2
(45) Date of Patent: Feb. 8, 2005

(54) OPTICAL COMMUNICATION MODULE AND MANUFACTURING METHOD THEREOF

(75) Inventor: Naoki Kimura, Tokyo (JP)

(73) Assignee: NEC Corporation, Tokyo (JP)

( * ) Notice: Subject to any disclaimer, the term of this patent is extended or adjusted under 35 U.S.C. 154(b) by 344 days.

(21) Appl. No.: 09/983,105

(22) Filed: Oct. 23, 2001

(65) Prior Publication Data

US 2002/0048431 A1 Apr. 25, 2002

(30) Foreign Application Priority Data

Oct. 23, 2000 (JP) ........................................ 2000-322145

(51) Int. Cl.[7] .............................................. G02B 6/26
(52) U.S. Cl. .......................................... 385/47; 385/18
(58) Field of Search .............................. 385/47, 18, 27, 385/65, 83

(56) References Cited

U.S. PATENT DOCUMENTS

| | | | | |
|---|---|---|---|---|
| 5,500,910 A | * | 3/1996 | Boudreau et al. ............ | 385/24 |
| 5,579,154 A | * | 11/1996 | Mueller-Fiedler et al. ..................... | 359/341.1 |
| 5,764,832 A | * | 6/1998 | Tabuchi ....................... | 385/49 |
| 5,771,322 A | * | 6/1998 | Matsumoto et al. ......... | 385/31 |
| 5,854,867 A | * | 12/1998 | Lee et al. ..................... | 385/49 |

FOREIGN PATENT DOCUMENTS

| | | | | |
|---|---|---|---|---|
| EP | 44 02 166 A1 | 11/1994 | | |
| EP | 0 822 430 A2 | 2/1998 | | |
| EP | 0 903 596 A2 | 3/1999 | | |
| JP | 363033707 A | * 2/1988 | ........... | G02B/6/12 |
| JP | 10082925 | * 3/1988 | ........... | G02B/6/26 |
| JP | 63-191111 | 8/1988 | | |
| JP | 10-82925 | 3/1998 | | |
| JP | 10-224310 | 8/1998 | ........... | H04B/10/28 |
| JP | 10-300961 | 11/1998 | | |
| JP | 11-68705 | 3/1999 | ........... | H04J/14/00 |
| JP | 11-218629 | 8/1999 | | |
| JP | 11-237529 | 8/1999 | ........... | G02B/6/42 |
| JP | 2000-208858 | 7/2000 | | |
| JP | 2000-214345 | 8/2000 | | |

OTHER PUBLICATIONS

1) European Search Report dated Dec. 19, 2003.
2) Yoshimura R. et al., "Low–Loss Polymeric Optical Waveguides with 45 Degree Mirrors", Japanese Journal of Applied Physics, Publication Office of Japanese Journal of Applied Physics, Tokyo, JP, vol. 37, no. 6B, Jun. 1998, pp. 3657–3661, XP000860805.
Japanese Office Action dated Feb. 25, 2004, with partial English translation.
Japanese Office Action dated Dec. 1, 2003, with partial English translation.

* cited by examiner

*Primary Examiner*—Frank G. Font
*Assistant Examiner*—K. Cyrus Kianni
(74) *Attorney, Agent, or Firm*—McGinn & Gibb, PLLC

(57) ABSTRACT

An optical communication module for communicating a light signal including a groove portion whose section is V-shaped and provided on the surface of an optical waveguide substrate, on one of two surfaces of which groove portion a mirror is formed by the coating with a metal film and in the vicinity of the other surface of which groove portion, a tip of an optical waveguide on the optical waveguide substrate is provided, whereby a signal light guided by the optical waveguide is reflected by the mirror of the metal film so as to be incident on a light-receiving element disposed on the surface of the optical waveguide substrate.

20 Claims, 12 Drawing Sheets

OPTICAL COMMUNICATION MODULE AND MANUFACTURING METHOD THEREOF

BACKGROUND OF THE INVENTION

1. Field of the Invention

The present invention relates to an optical communication module in optical communication and, more particularly, to an optical communication module having a mirror which reflects a signal light and folds the same and a manufacturing method thereof.

2. Description of the Related Art

One of conventional optical communication modules having a mirror for reflecting a propagated light which is provided midway through an optical waveguide to couple the propagated light with a light-receiving element is, for example, the optical communication module disclosed in Japanese Patent Laying-Open (Kokai) No. Heisei 10-224310 which is illustrated in FIG. 10.

The conventional technique disclosed in Japanese Patent Laying-Open (Kokai) No. Heisei 10-224310 is intended to realize an optical communication module for conducting bidirectional communication using signal lights of the same wavelength by a small-sized and simple structure. In the structure, a Y-branch type optical waveguide is formed on an optical waveguide substrate, a mirror is provided midway through a branch side waveguide for reflecting a propagated light to the side of the surface of the optical waveguide substrate, a light-receiving element is provided facing the crossover portion between the one branch side waveguide and the mirror, and a light-emitting element is provided facing the crossover portion between the other branch side waveguide and the mirror.

Because an Y-branch type optical waveguide which can be formed minutely and to high precision is used on the optical waveguide substrate and the light-receiving element and the light-emitting element are enabled to be surface-packaged on the optical waveguide substrate, an optical communication module for conducting bidirectional communication using signal lights of the same wavelength can be realized with a small-sized and simple structure.

Another example is the conventional optical communication module for conducting bidirectional communication using two signal lights of different wavelengths, which is disclosed in Japanese Patent Laying-open (Kokai) No. Heisei 11-068705 and illustrated in FIG. 11.

The conventional art disclosed in Japanese Patent Laying-Open No. Heisei 11-068705 is intended to reduce crosstalk light which is leakage of an LD (laser diode) light as a transmitted light in a PD (photodiode) light as a received light down to a level causing no problem in practical use. In the module, an optical branch waveguide is formed on a plane substrate, a groove is provided at a branch portion of the optical branch waveguide, a dielectric multilayer filter for branching an input light into its penetration direction and a reflection direction according to its wavelength is inserted into the groove, and a transmission LD and a reception PD to be optically coupled with the optical branch waveguide are provided on the plane substrate.

With a penetration wavelength of the dielectric multilayer filter set to be as a reception wavelength of the reception PD and a blocking wavelength of the dielectric multilayer filter set to be as a transmission wavelength of the transmission LD and the transmission LD and the reception PD arranged at positions opposed to each other with the dielectric multilayer filter provided therebetween, bidirectional WDM (wavelength division multiplexing) optical communication is conducted.

A further example of conventional optical communication modules is disclosed in Japanese Patent Laying-Open (Kokai) No. Heisei 11-237529, which is illustrated in FIG. 12.

The optical communication module according to the conventional technique disclosed in Japanese Patent Laying-Open No. Heisei 11-237529 has a structure in which with a buffer and a clad formed on the upper surface of an Si substrate to have slant surfaces, a signal light is folded upward and received by a PD by making the use of reflection caused by a difference in refractive indexes between air on the slant surfaces and the clad.

The above-described conventional optical communication modules, however, have the following problems.

First, with conventional optical communication modules having a groove of a small width, because of a structure in which a mirror and a filter are inserted into the narrow groove, much labor is cost for their manufacturing and moreover, automation of a manufacturing process is difficult, which make manufacturing costs extremely high.

Because the conventional art disclosed in Japanese Patent Laying-Open No. Heisei 10-224310, for example, has a structure in which a mirror is inserted into a groove formed slantwise and the conventional art disclosed in Japanese Patent Laying-Open No. Heisei 11-068705 has a structure in which a dielectric multilayer filter is inserted into a groove provided at a branch portion of an optical branch waveguide, both require extremely laborious work for inserting the filter or the like into a narrow groove.

Secondly, the conventional optical communication modules in which a signal light penetrating a filter at a groove portion is received by a PD need a groove to be formed to have an extremely small width in order to suppress loss of a received signal light at the groove portion. For this purpose, as a dielectric multilayer filter to be inserted, a filter whose material is thin and soft such as polyimide should be used, which makes handling of the filter at its insertion be worse than that of a filter of a hard material to make automation of a filter insertion process difficult.

Thirdly, in the conventional optical communication modules which output a signal light reflected on a filter at a groove portion from an optical waveguide to an external optical fiber, because a slant of the filter relative to an end surface of the waveguide largely affects coupling characteristics between a reflected light on the filter and the optical waveguide, the filter should be inserted very carefully so as not to slant relative to the end surface of the waveguide, whereby reduction in assembly costs is difficult.

Fourthly, the conventional optical communication modules in which a signal light is reflected from inside a substrate and received by a PD disposed on the surface of the substrate, which make the use of reflection caused by a difference in refractive indexes between air and a clad for the reflection of the signal light, need air within a groove portion having a reflection surface. In a case, for example, where an optical communication module is covered with a transparent resin or the like, because a refractive index of a transparent resin is closer to that of a clad than to that of air, reflection on a slant surface might not be obtained. Therefore, use of simplified sealing by transparent resins and use of packaging realized by protecting an optical system with transparent resins and by molding the entire system are impossible, resulting in limiting packaging methods.

SUMMARY OF THE INVENTION

An object of the present invention is to solve the above-described shortcomings of conventional techniques and to provide an optical communication module which can be produced with a simple process and low costs and a manufacturing method thereof.

Another object of the present invention is to solve the above-described shortcomings of conventional techniques and to provide an optical communication module which needs no provision of a narrow groove and allows selection of a packaging method using transparent resins because a signal light can be fully reflected even when a groove is covered with transparent resins and a manufacturing method thereof.

According to the first aspect of the invention, an optical communication module for communicating a light signal, comprises a groove portion whose section is V-shaped and which is formed on the surface of an optical waveguide substrate, wherein on one of two surfaces of the groove portion, a mirror is formed to reflect a light incident from the side of the other surface and make the light be incident on a light-receiving element disposed on the surface of the optical waveguide substrate.

In the preferred construction, the mirror is formed by coating the one surface of the groove portion with a metal film.

In another preferred construction, a light-emitting element for emitting a transmitted signal light to an optical waveguide is disposed in the vicinity of the surface of the groove portion at the side from which a light is incident onto the mirror such that a rear output light of the light-emitting element is reflected by the mirror so as to be incident on a monitoring light-receiving element for monitoring the output of the light-emitting element.

In another preferred construction, the mirror is formed by coating the one surface of the groove portion with a metal film, and a light-emitting element for emitting a transmitted signal light to an optical waveguide is disposed in the vicinity of the surface of the groove portion at the side from which a light is incident onto the mirror such that a rear output light of the light-emitting element is reflected by the mirror so as to be incident on a monitoring light-receiving element for monitoring the output of the light-emitting element.

In another preferred construction, the optical communication module further comprises a tip of an optical waveguide on the optical waveguide substrate provided in the vicinity of the surface of the groove portion at the side from which a light is incident onto the mirror, wherein the mirror reflects a signal light guided by the optical waveguide so as to be incident onto the light-receiving element.

In another preferred construction, the optical communication module further comprises a tip of an optical waveguide on the optical waveguide substrate provided in the vicinity of the surface of the groove portion at the side from which a light is incident onto the mirror, wherein the mirror is formed by coating the one surface of the groove portion with a metal film to reflect a signal light guided by the optical waveguide so as to be incident onto the light-receiving element.

In another preferred construction, the optical communication module further comprises a tip of an optical waveguide on the optical waveguide substrate provided in the vicinity of the surface of the groove portion at the side from which a light is incident onto the mirror, wherein the mirror reflects a signal light guided by the optical waveguide so as to be incident onto the light-receiving element, on the surface of the groove portion at the side from which a light is incident onto the mirror, a filter which allows a signal light having a wavelength of a received signal light incident from the optical waveguide to penetrate and fails to allow a noise light having a wavelength different from the wavelength of the received signal light to penetrate is disposed slantwise with respect to the optical waveguide.

In another preferred construction, the optical communication module further comprises a tip of an optical waveguide on the optical waveguide substrate provided in the vicinity of the surface of the groove portion at the side from which a light is incident onto the mirror, wherein the mirror is formed by coating the one surface of the groove portion with a metal film to reflect a signal light guided by the optical waveguide so as to be incident onto the light-receiving element, and on the surface of the groove portion at the side from which a light is incident onto the mirror, a filter which allows a signal light having a wavelength of a received signal light incident from the optical waveguide to penetrate and fails to allow a noise light having a wavelength different from the wavelength of the received signal light to penetrate is disposed slantwise with respect to the optical waveguide.

In another preferred construction, the optical communication module further comprises, in the vicinity of the surface of the groove portion at the side from which a light is incident onto the mirror, a tip of a first optical waveguide for guiding a transmitted signal light and a tip of a second optical waveguide for guiding a received signal light and guiding the transmitted signal light reflected at the groove portion, whereby the received signal light guided by the second optical waveguide is reflected to be incident onto the light-receiving element.

In another preferred construction, the mirror is formed by coating the one surface of the groove portion with a metal film, and which further comprises in the vicinity of the surface of the groove portion at the side from which a light is incident onto the mirror, a tip of a first optical waveguide for guiding a transmitted signal light and a tip of a second optical waveguide for guiding a received signal light and guiding the transmitted signal light reflected at the groove portion, whereby the received signal light guided by the second optical waveguide is reflected to be incident onto the light-receiving element.

In another preferred construction, the optical communication module further comprises, in the vicinity of the surface of the groove portion at the side from which a light is incident onto the mirror, a tip of a first optical waveguide for guiding a transmitted signal light and a tip of a second optical waveguide for guiding a received signal light and guiding the transmitted signal light reflected at the groove portion, whereby the received signal light guided by the second optical waveguide is reflected to be incident onto the light-receiving element, wherein on the surface of the groove portion at the side from which a light is incident onto the mirror, a filter which allows a signal light having a wavelength of the received signal light to penetrate and reflects a signal light having a wavelength of the transmitted signal light is disposed.

In another preferred construction, the mirror is formed by coating the one surface of the groove portion with a metal film, and which further comprises in the vicinity of the surface of the groove portion at the side from which a light is incident onto the mirror, a tip of a first optical waveguide for guiding a transmitted signal light and a tip of a second optical waveguide for guiding a received signal light and guiding the transmitted signal light reflected at the groove portion, whereby the received signal light guided by the second optical waveguide is reflected to be incident onto the light-receiving element, wherein on the surface of the groove portion at the side from which a light is incident onto the mirror, a filter which allows a signal light having a wavelength of the received signal light to penetrate and reflects a signal light having a wavelength of the transmitted signal light is disposed.

In another preferred construction, the optical communication module further comprises, in the vicinity of the surface of the groove portion at the side from which a light is incident onto the mirror, a tip of a first optical waveguide for guiding a transmitted signal light and a tip of a second optical waveguide for guiding a received signal light and guiding the transmitted signal light reflected at the groove portion, whereby the received signal light guided by the second optical waveguide is reflected to be incident onto the light-receiving element, and on the surface of the groove portion at the side from which a light is incident onto the mirror, a half mirror which reflects an incident signal light and at the same time allows the light to penetrate, wherein the light-receiving element is disposed at a position where a received signal light incident from the first optical waveguide, penetrating the half mirror and reflected by the mirror can be received and where a transmitted signal light incident from the second optical waveguide, penetrating the half mirror and reflected by the mirror can be avoided.

In another preferred construction, the mirror is formed by coating the one surface of the groove portion with a metal film, and which further comprises:

in the vicinity of the surface of the groove portion at the side from which a light is incident onto the mirror, a tip of a first optical waveguide for guiding a transmitted signal light and a tip of a second optical waveguide for guiding a received signal light and guiding the transmitted signal light reflected at the groove portion, whereby the received signal light guided by the second optical waveguide is reflected to be incident onto the light-receiving element, and on the surface of the groove portion at the side from which a light is incident onto the mirror, a half mirror which reflects an incident signal light and at the same time allows the light to penetrate, wherein the light-receiving element is disposed at a position where a received signal light incident from the first optical waveguide, penetrating the half mirror and reflected by the mirror can be received and where a transmitted signal light incident from the second optical waveguide, penetrating the half mirror and reflected by the mirror can be avoided.

In another preferred construction, the optical communication module further comprises, in the vicinity of the surface of the groove portion at the side from which a light is incident onto the mirror, a tip of a first optical waveguide for guiding a transmitted signal light and a tip of a second optical waveguide for guiding a received signal light and guiding the transmitted signal light reflected at the groove portion, whereby the received signal light guided by the second optical waveguide is reflected to be incident onto the light-receiving element, and two portions of the groove portion on the optical waveguide substrate, a first groove portion and a second groove portion, wherein the first groove portion reflects a rear output light of a light-emitting element for emitting the transmitted signal light by the internally provided mirror to make the light be incident onto a monitoring light-receiving element for monitoring an output of the light-emitting element, and the second groove portion reflects the received signal light by the internally provided mirror to make the light be incident onto the light-receiving element for receiving the received signal light.

In another preferred construction, the mirror is formed by coating the one surface of the groove portion with a metal film, and which further comprises in the vicinity of the surface of the groove portion at the side from which a light is incident onto the mirror, a tip of a first optical waveguide for guiding a transmitted signal light and a tip of a second optical waveguide for guiding a received signal light and guiding the transmitted signal light reflected at the groove portion, whereby the received signal light guided by the second optical waveguide is reflected to be incident onto the light-receiving element, and two portions of the groove portion on the optical waveguide substrate, a first groove portion and a second groove portion, wherein the first groove portion reflects a rear output light of a light-emitting element for emitting the transmitted signal light by the internally provided mirror to make the light be incident onto a monitoring light-receiving element for monitoring an output of the light-emitting element, and the second groove portion reflects the received signal light by the internally provided mirror to make the light be incident onto the light-receiving element for receiving the received signal light.

In another preferred construction, the optical communication module further comprises a V-shaped groove in which an optical fiber is to be disposed.

According to the second aspect of the invention, an optical communication device having an optical communication module for communicating a light signal, the optical communication module including a groove portion whose section is V-shaped and which is formed on the surface of an optical waveguide substrate, wherein on one of two surfaces of the groove portion, a mirror is formed to reflect a light incident from the side of the other surface and make the light be incident on a light-receiving element disposed on the surface of the optical waveguide substrate.

In the preferred construction, the mirror is formed by coating the one surface of the groove portion with a metal film.

In another preferred construction, the optical communication device further comprises a tip of an optical waveguide on the optical waveguide substrate provided in the vicinity of the surface of the groove portion at the side from which a light is incident onto the mirror, wherein the mirror reflects a signal light guided by the optical waveguide so as to be incident onto the light-receiving element.

In another preferred construction, the optical communication device further comprises a tip of an optical waveguide on the optical waveguide substrate provided in the vicinity of the surface of the groove portion at the side from which a light is incident onto the mirror, wherein the mirror is formed by coating the one surface of the groove portion with a metal film to reflect a signal light guided by the optical waveguide so as to be incident onto the light-receiving element.

According to another aspect of the invention, a method of manufacturing an optical communication module for communicating a light signal, comprising the steps of forming an optical waveguide for guiding a light signal on an optical waveguide substrate, forming a groove portion whose section is V shaped on the surface of the optical waveguide substrate, and forming a mirror on one of two surfaces that the groove portion has.

In the preferred construction, at the mirror forming step, the one surface of the groove portion is formed by coating the surface with a metal film.

In another preferred construction, at the groove portion forming step, first, one of the two surfaces of the groove portion is formed on the surface of the optical waveguide substrate using a blade for cutting and the remaining surface is subsequently formed to make the groove portion.

In another preferred construction, at the mirror forming step, the one surface of the groove portion is formed by coating the surface with a metal film, and at the groove portion forming step, first, one of the two surfaces of the groove portion is formed on the surface of the optical waveguide substrate using a blade for cutting and the remaining surface is subsequently formed to make the groove portion.

In another preferred construction, at the groove portion forming step, first, one of the two surfaces of the groove portion is formed on the surface of the optical waveguide substrate using a blade for cutting and the remaining surface is subsequently formed to make the groove portion, and further at the groove portion forming step, a first surface is formed by vertically inserting the blade into the surface of the optical waveguide substrate and a slant surface forming the mirror, which is the remaining surface, is subsequently formed by inserting the blade slantwise into the surface of the optical waveguide substrate.

In another preferred construction, at the mirror forming step, the one surface of the groove portion is formed by coating the surface with a metal film, at the groove portion forming step, first, one of the two surfaces of the groove portion is formed on the surface of the optical waveguide substrate using a blade for cutting and the remaining surface is subsequently formed to make the groove portion, and further at the groove portion forming step, a first surface is formed by vertically inserting the blade into the surface of the optical waveguide substrate and a slant surface for forming the mirror, which is the remaining surface, is subsequently formed by inserting the blade slantwise into the surface of the optical waveguide substrate.

In another preferred construction, at the groove portion forming step, the two surfaces of the groove portion are simultaneously formed by cutting the surfaces out of the optical waveguide substrate using a blade for cutting which is formed to match the configuration of the groove portion.

In another preferred construction, at the mirror forming step, the one surface of the groove portion is formed by coating the surface with a metal film, and at the groove portion forming step, the two surfaces of the groove portion are simultaneously formed by cutting the surfaces out of the optical waveguide substrate using a blade for cutting which is formed to match the configuration of the groove portion.

In another preferred construction, at the groove portion forming step, first, one of the two surfaces of the groove portion is formed on the surface of the optical waveguide substrate using a blade for cutting and the remaining surface is subsequently formed to make the groove portion, and further at the groove portion forming step, by using the blade with respect to the optical waveguide substrate being yet to be cut out from a wafer, the groove portions are formed in the lump in a plurality of the optical waveguide substrates aligned on the wafer.

In another preferred construction, at the mirror forming step, the one surface of the groove portion is formed by coating the surface with a metal film, at the groove portion forming step, first, one of the two surfaces of the groove portion is formed on the surface of the optical waveguide substrate using a blade for cutting and the remaining surface is subsequently formed to make the groove portion, and further at the groove portion forming step, by using the blade with respect to the optical waveguide substrate yet to be cut out from a wafer, the groove portions are formed in the lump in a plurality of the optical waveguide substrates aligned on the wafer.

In another preferred construction, the optical communication module manufacturing method further includes the step of forming two the groove portions in one the optical waveguide substrate, a first groove portion for monitoring an output of a transmitted signal light and a second groove portion for receiving a received signal light.

In another preferred construction, at the mirror forming step, the one surface of the groove portion is formed by coating the surface with a metal film, and which further comprises the step of forming two the groove portions in one the optical waveguide substrate, a first groove portion for monitoring an output of a transmitted signal light and a second groove portion for receiving a received signal light.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1A:
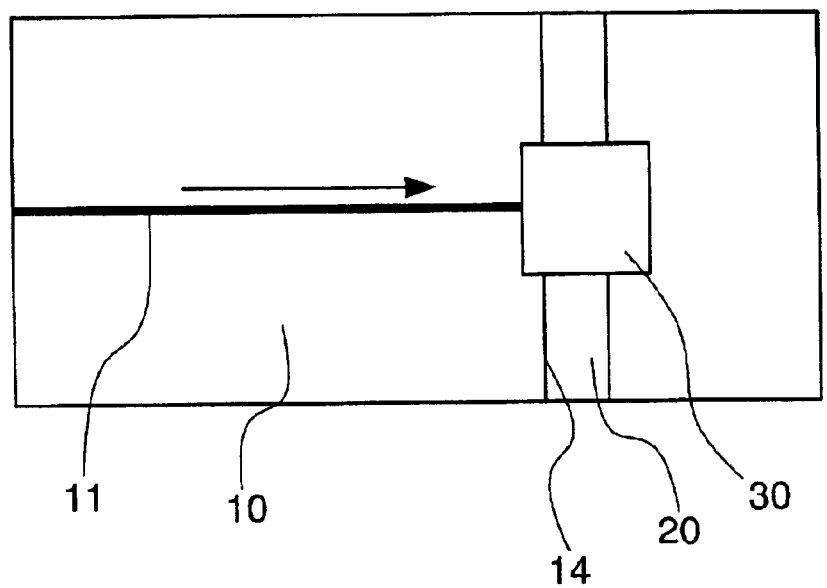
FIG. 1A is a plan view showing a structure of an optical communication module according to a first embodiment of the present invention.
Figure 1B:
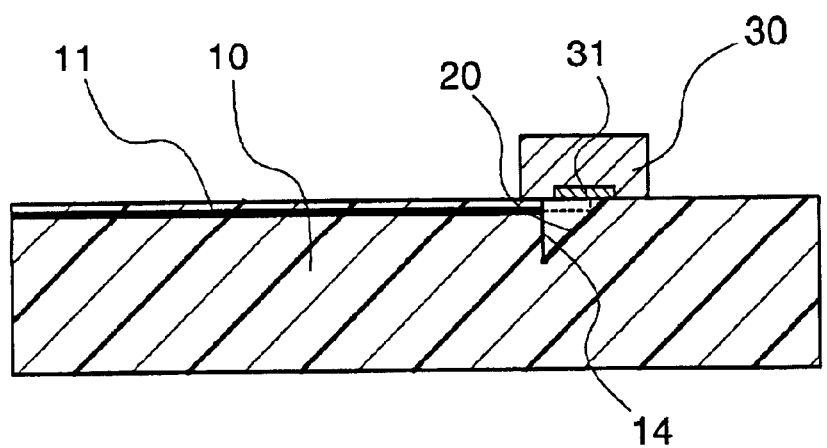
FIG. 1B is a sectional view showing the structure of the optical communication module according to the first embodiment of the present invention.

FIGS. 1A and 1B are views showing a structure of an optical communication module according to a first embodiment of the present invention. The optical communication module according to the present embodiment conducts only the reception of a signal light.

With reference to FIGS. 1A and 1B, the optical communication module according to the first embodiment of the present invention includes an optical waveguide substrate 10 and a light-receiving element 30. In addition, formed on the optical waveguide substrate 10 are an optical waveguide 11, a folded mirror 20 and a waveguide end surface 14. The folded mirror 20 and the waveguide end surface 14 form the respective surfaces of a groove portion formed on the optical waveguide substrate 10 to have two surfaces.

The folded mirror 20 reflects a signal light received from the optical waveguide 11 toward the surface of the optical waveguide substrate 10 so as to be incident on a light-receiving surface 31 of the light-receiving element 30. The folded mirror 20 can be formed by cutting the substrate slantwise as shown in FIGS. 1A and 1B and then metallizing the surface with such a metal film as Au. In other words, a slant portion is coated with metal by vapor deposition, flame-coating or other method to form the mirror 20.

The light-receiving element 30 is mounted on the optical waveguide substrate 10 so as to couple with the signal light incident from the optical waveguide 11 and reflected by the folded mirror 20.

In the signal light receiving operation of the optical communication module according to the present embodiment, first, a received signal light input from the optical waveguide 11 is reflected by the folded mirror 20 and sent to the surface side of the optical waveguide substrate 10, whereby the light is received by the light-receiving surface 31 of the light-receiving element 30.

As described in the foregoing, the optical communication module according to the present embodiment allows the light-receiving element 30 to be surface-mounted on the optical waveguide substrate 10 by adopting a structure in which a light path is folded by the folded mirror 20 toward the side of the surface of the optical waveguide substrate 10.

Figure 2A:
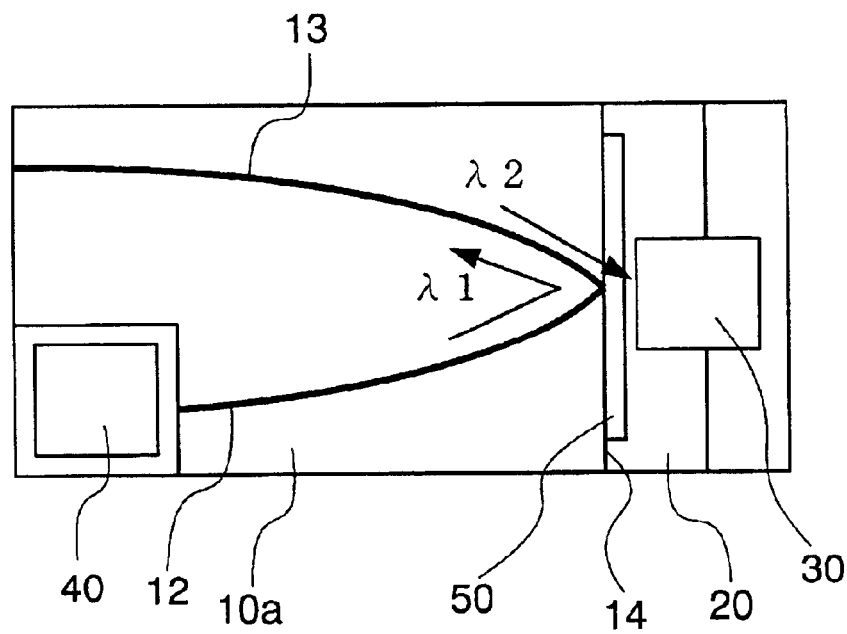
FIG. 2A is a plan view showing a structure of an optical communication module according to a second embodiment of the present invention.
Figure 2B:
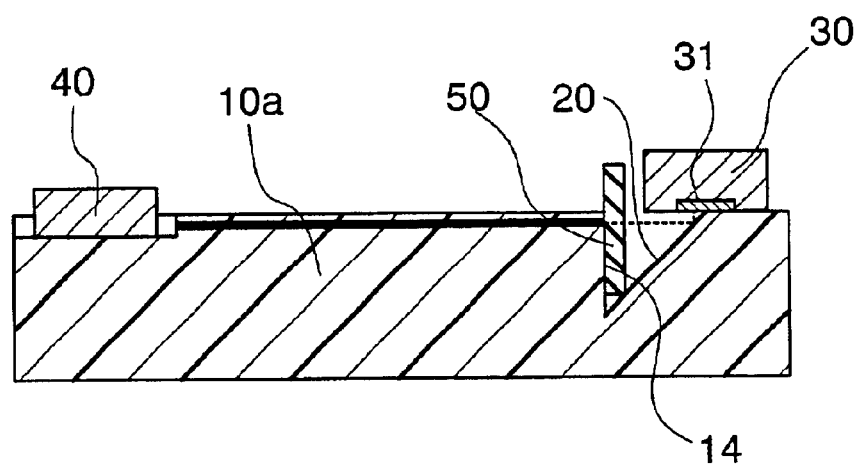
FIG. 2B is a sectional view showing the structure of the optical communication module according to the second embodiment of the present invention.

FIGS. 2A and 2B are views showing a structure of an optical communication module according to a second embodiment of the present invention. The optical communication module of the present embodiment conducts transmission and reception of signal lights of different wavelengths.

With reference to FIGS. 2A and 2B, the optical communication module according to the second embodiment of the present invention includes an optical waveguide substrate 10*a*, a light-receiving element 30, a light-emitting element 40 and a filter 50. The optical waveguide substrate 10*a* includes a first optical waveguide 12, a second optical waveguide 13, the folded mirror 20 and the waveguide end surface 14.

The folded mirror 20 reflects a signal light received from the second optical waveguide 13 toward the side of the surface of the optical waveguide substrate 10*a* so as to be incident on the light-receiving surface 31 of the light-receiving element 30. The folded mirror 20 can be formed by cutting the substrate slantwise as shown in FIGS. 2A and 2B and then metallizing the surface with such a metal film as Au.

The light-emitting element 40, which emits a signal light, is mounted on the optical waveguide substrate 10*a* so as to couple with the first optical waveguide 12.

To the waveguide end surface 14, the filter 50 is adhered to reflect a signal light from the first optical waveguide 12 which is emitted by the light-emitting element 40 so as to be coupled with the second optical waveguide 13.

As the filter 50, a dielectric multilayer which reflects a signal light and allows the light to penetrate according to its wavelength is deposited by evaporation. Then, the filter reflects a transmitted signal light having a wavelength of $\lambda 1$ which is emitted by the light-emitting element 40 and allows a received signal light having a wavelength of $\lambda 2$ received from the second optical waveguide 13 to penetrate.

Therefore, the transmitted signal light having the wavelength of $\lambda 1$ which is sent from the first optical waveguide 12 is reflected by the filter 50, coupled with the second optical waveguide 13 and externally transmitted. On the other hand, the received signal light having the wavelength of $\lambda 2$ which is received from the second optical waveguide 13 penetrates the filter 50 and sent to the light-receiving element 30.

The light-receiving element 30 is mounted on the optical waveguide substrate 10*a* such that the received signal light having the wavelength of $\lambda 2$ which is incident from the second optical waveguide 13 and penetrates the filter 50 is reflected by the folded mirror 20 and then coupled with the light-receiving element.

Next, description will be made of operation of transmitting and receiving a signal light at the optical communication module according to the present embodiment.

In signal light receiving operation, first, the received signal light incident from the second optical waveguide 13 which has the wavelength of $\lambda 2$ penetrates by the filter 50, is reflected by the folded mirror 20 and sent to the side of the surface of the optical waveguide substrate 10*a*, so that the light-receiving surface 31 of the light-receiving element 30 receives the light.

In signal light transmitting operation, first, the transmitted signal light emitted from the light-emitting element 40 and having the wavelength of $\lambda 1$ is guided through the first optical waveguide 12, reflected by the filter 50, coupled with the second optical waveguide 13 and led to a transmission path.

By thus adopting a structure of making a received signal light penetrate the filter 50, be reflected by the mirror 20 and be received by the light-receiving element 30 and furthermore making a transmitted signal light from the light-emitting element 40 be reflected by the filter 50 and guided to an external transmission path, the optical communication module of the present embodiment realizes, in addition to the effect attained by the first embodiment, signal light transmission and reception of transmitting a light having the wavelength of $\lambda 1$ and receiving a light having the wavelength of $\lambda 2$.

Next, description will be made of a method of manufacturing the optical communication modules of the present invention shown in the above-described first and second embodiments. Since the present invention is in particular characterized in having the mirror 20 which folds a signal light, the description will be made of a method of manufacturing the folded mirror 20.

FIGS. 3A to 3D are views for use in explaining one embodiment of the optical communication module manufacturing method according to the present invention, which show a process of forming the folded mirror 20.

Figure 3A:
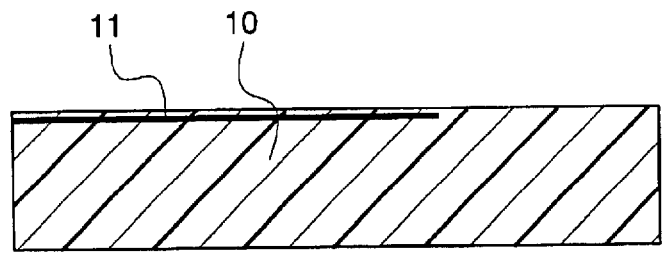
FIG. 3A is a view for use in explaining a process of an optical communication module manufacturing method according to the present invention.

With reference to FIGS. 3A to 3D, first, form the optical waveguide 11 on the optical waveguide substrate 10 (FIG. 3A). The number of the waveguides is not limited to one and this process is the same also in a case where two, the first optical waveguide 12 and the second optical waveguide 13 are provided as in the second embodiment.

Figure 3B:
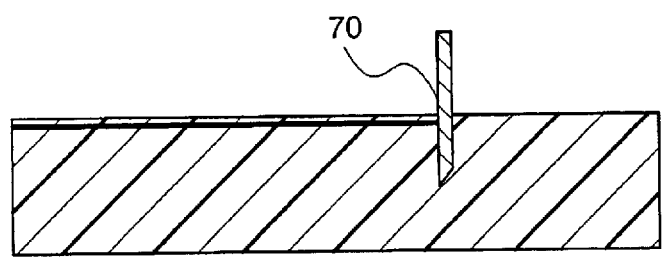
FIG. 3B is a view for use in explaining a process of the optical communication module manufacturing method according to the present invention.

Then, vertically insert a blade 70 for cutting into the optical waveguide substrate 10 to form the waveguide end surface 14 (FIG. 3B).

Figure 3C:
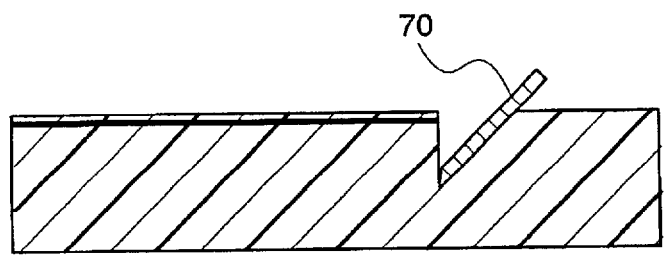
FIG. 3C is a view for use in explaining a process of the optical communication module manufacturing method according to the present invention.

Subsequently, insert the blade 70 slantwise into the optical waveguide substrate 10 to form a slant surface for a folded mirror (FIG. 3C).

Figure 3D:
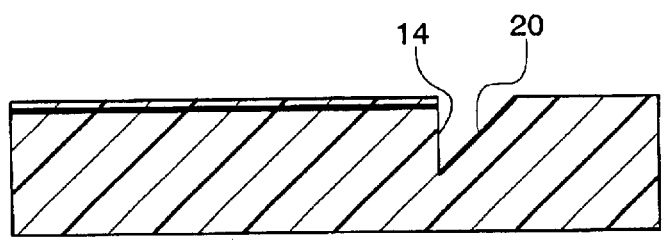
FIG. 3D is a view for use in explaining a process of the optical communication module manufacturing method according to the present invention.

Lastly, metallize the slant surface with a metal film such as Au to complete the folded mirror 20 (FIG. 3D).

Figure 4:
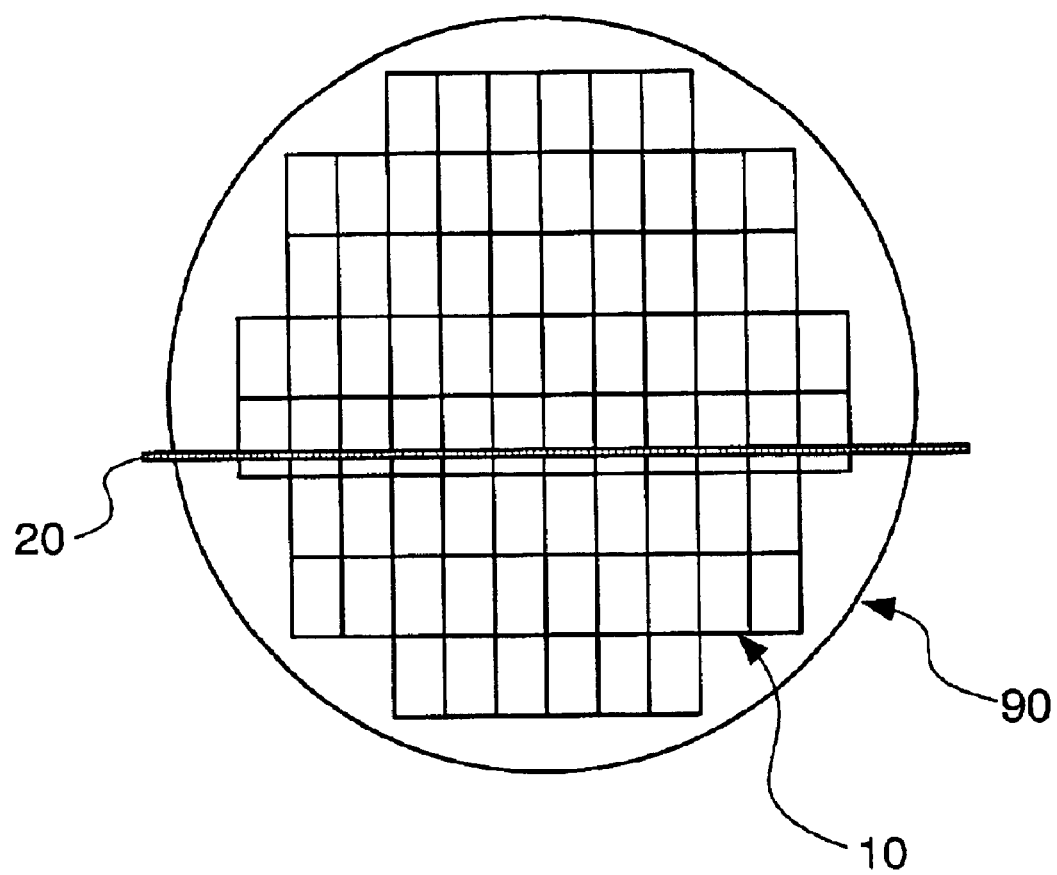
FIG. 4 is a view for use in explaining one embodiment for forming a folded mirror at a state of a wafer in the optical communication module manufacturing method according to the present invention.

Since the respective optical waveguide substrates 10 align within a wafer 90 as shown in FIG. 4 at the time of manufacturing the optical waveguide substrate 10, the folded mirrors 20 can be manufactured in the lump at the state of the wafer 90 by inserting the blade straightly into the wafer 90.

For the wafer 90 which is a material of the optical waveguide substrate 10, various kinds of semiconductor materials can be used such as silicon, GaAs and InP. As a material of the optical waveguide substrate 10, a ceramic plate, a polymer plate, a metal plate or the like can be used other than these materials. In any case, the optical waveguide substrate 10 and the optical communication module can be manufactured by the above-described manufacturing method.

Next, another method of manufacturing the folded mirror 20 will be described.

Figure 5A:
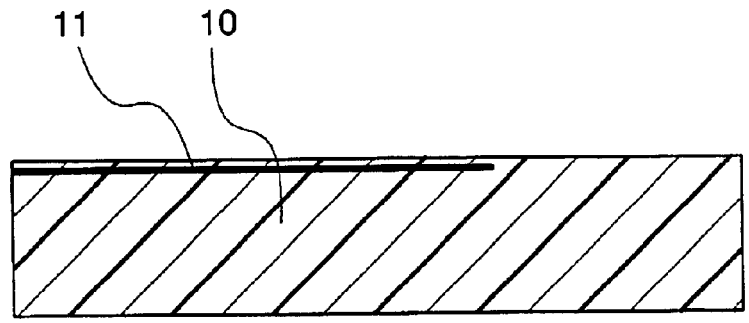
FIG. 5A is a view for use in explaining another embodiment of the optical communication module manufacturing method according to the present invention.
Figure 5B:
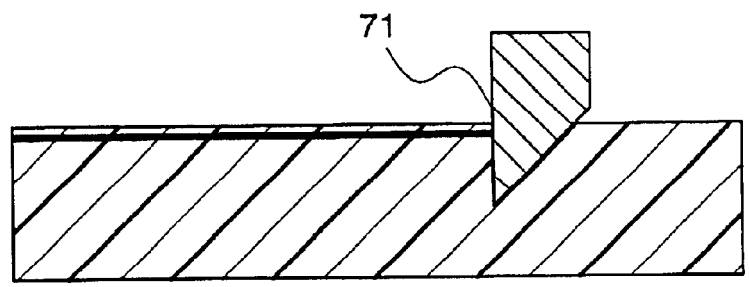
FIG. 5B is a view for use in explaining another embodiment of the optical communication module manufacturing method according to the present invention.
Figure 5C:
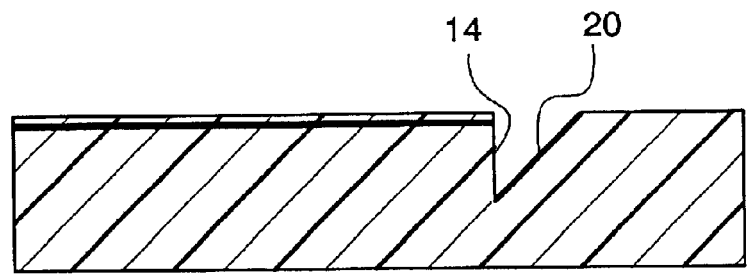
FIG. 5C is a view for use in explaining another embodiment of the optical communication module manufacturing method according to the present invention.

FIGS. 5A to 5C are views for use in explaining another embodiment of the optical communication module manufacturing method according to the present invention. In the present embodiment, by using a blade 71 having a width larger than that of the blade 70 in the above-described manufacturing method shown in FIGS. 3A to 3D, the substrate is cut off at once not at two times separately as in the previous embodiment.

More specifically, first, form the optical waveguide 11 on the optical waveguide substrate 10 (FIG. 5A).

Then, insert the blade 71 for cutting into the optical waveguide substrate 10 to simultaneously form the waveguide end surface 14 and the slant surface of the folded mirror 20 (FIG. 5B). Here, in order to simultaneously form the waveguide end surface 14 and the slant surface of the folded mirror 20, the blade 71 is configured to match the angle of the slant surface.

Lastly, metallize the slant surface of the folded mirror 20 with such a metal film as Au to complete the folded mirror 20 (FIG. 5C).

In addition, also in the case of the present embodiment similarly to the previous embodiment shown in FIGS. 3A to 3D, since at the time of manufacturing of the optical waveguide substrate 10, the respective optical waveguide substrates 10 align within the wafer 90 as shown in FIG. 4, the folded mirror can be manufactured in the lump at the state of the wafer by inserting the blade straightly into the wafer 90.

In the optical communication module manufacturing method according to each of the above-described embodiments, because the folded mirror 20 is formed by metallizing the slant surface, sufficient reflection of a signal light can be obtained even when the groove portion is covered, for example, with a transparent resin. It is therefore possible to select various packaging methods using transparent resins for an optical communication module.

Moreover, formation of the folded mirror 20 directly on the optical waveguide substrate enables lump-sum formation of the mirrors 20 at the state of the wafer 90 and furthermore eliminates the need of laborious work of inserting the mirror in conventional manufacturing methods. Thus, automation of an assembling process is facilitated to realize drastic reduction in assembly costs.

In addition, the received signal light penetrating the filter 50 is received not through an optical waveguide as is done in conventional techniques but directly by a light-receiving element after being reflected by the mirror 20. It is therefore possible to increase a width of the groove at the folded mirror portion more than that in conventional structures.

Furthermore, in each of the above-described embodiments, because a shape of the groove at the folded mirror 20 is triangle whose width becomes larger as the depth becomes smaller, the work for inserting the filter 50 which has been conventionally laborious is facilitated.

A furthermore advantage is that because the structure is adopted in which a filter is attached to a waveguide end surface, the filter can be mounted on the waveguide end surface fixedly. A still further advantage is that because the thickness of the filter can be increased at will, a filter using a substrate of such a hard material as glass can be employed to improve workability of a filter attachment process and realize reduction in assembly costs and mass production through automation of the filter attachment process.

Next, a further embodiment of the present invention will be described in detail with reference to the drawings.

Figure 6A:
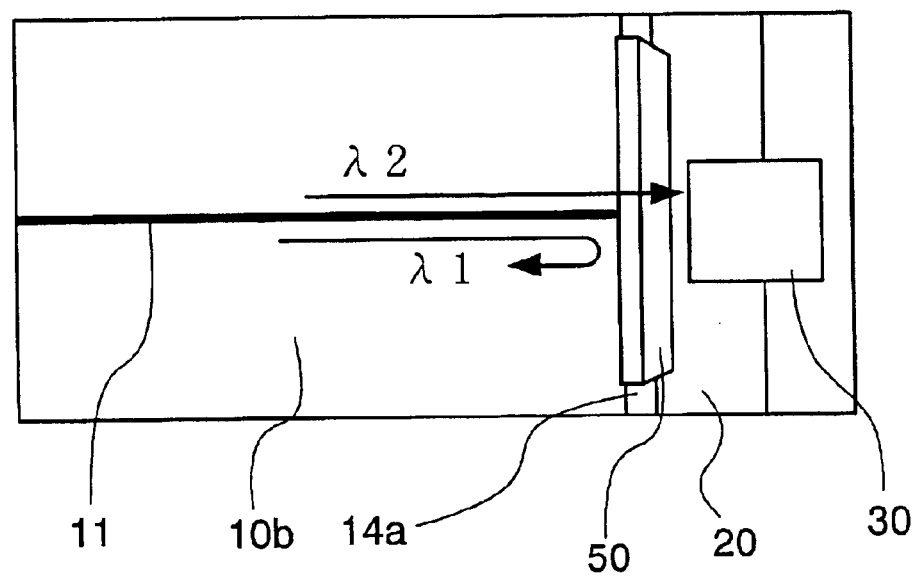
FIG. 6A is a plan view showing a structure of an optical communication module according to a third embodiment of the present invention.
Figure 6B:
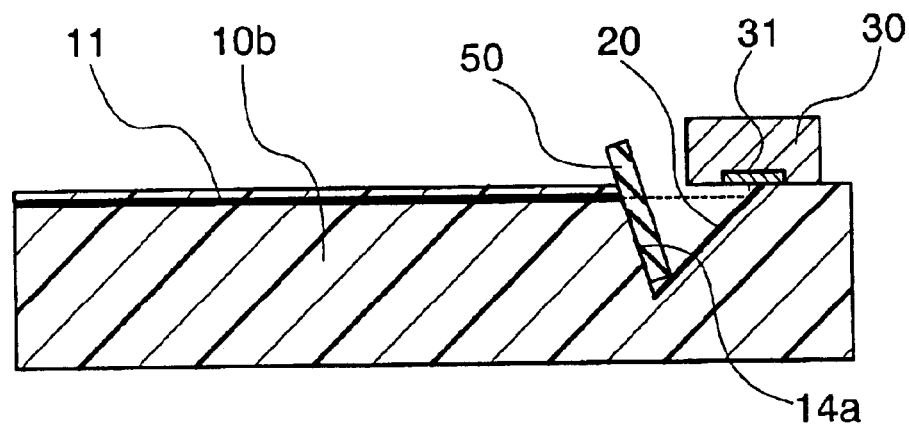
FIG. 6B is a sectional view showing the structure of the optical communication module according to the third embodiment of the present invention.

FIGS. 6A and 6B are views showing a structure of an optical communication module according to a third embodiment of the present invention. The optical communication module of the present embodiment conducts only the reception of a signal light.

The present embodiment is characterized not in that the light-receiving element 30 directly receives all the received signal lights input through the optical waveguide 11 but in that reception of unnecessary noise light is prevented by the attachment of the filter 50 to the waveguide end surface 14.

To the filter 50, a dielectric multilayer is deposited by evaporation which reflects a signal light or allows the same to penetrate according to its wavelength. As a result, the filter 50 allows a received signal light (wavelength of $\lambda 2$) to penetrate and reflects an input noise light having a wavelength (wavelength of $\lambda 1$) different from that of the received signal light.

The received signal light having the wavelength of $\lambda 2$ input through the optical waveguide 11 penetrates the filter 50 and is reflected by the folded mirror 20 toward the side of the surface of an optical waveguide substrate 10b and received by the light-receiving surface 31 of the light-receiving element 30. On the other hand, the input noise light having the wavelength of $\lambda 1$ input through the optical waveguide 11 will not be incident on the light-receiving element 30 because it is reflected by the filter 50.

By forming the waveguide end surface 14 slantwise relative to the waveguide 11, the present embodiment prevents an input noise light reflected by the filter 50 from returning to the optical waveguide 11.

As described in the foregoing, according to the present embodiment, provision of the filter 50 at the waveguide end surface 14 enables reception of only a received signal light and cut-off of an input noise light.

Figure 7A:
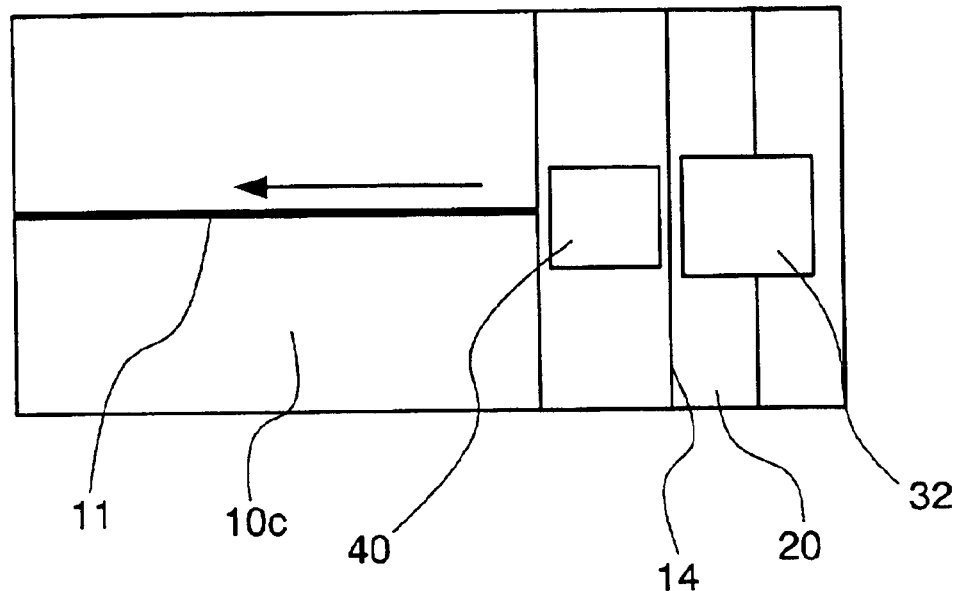
FIG. 7A is a plan view showing a structure of an optical communication module according to a fourth embodiment of the present invention.
Figure 7B:
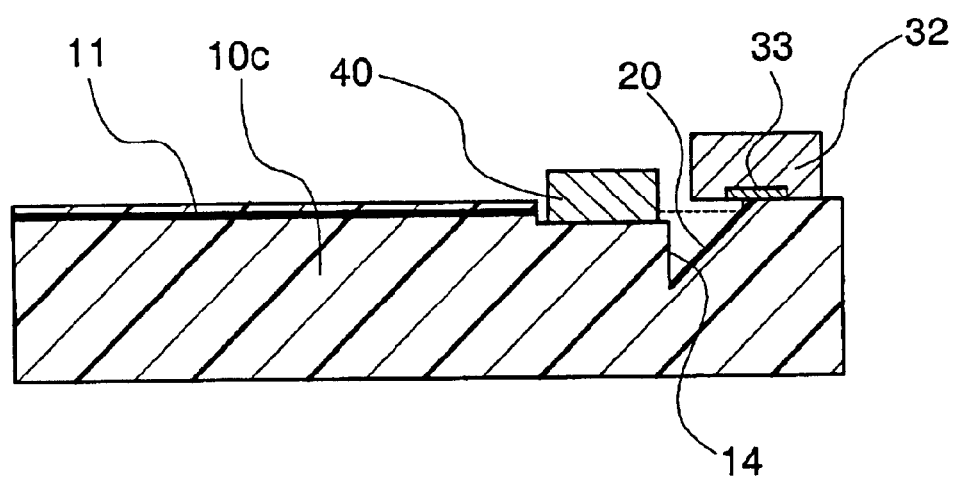
FIG. 7B is a sectional view showing the structure of the optical communication module according to the fourth embodiment of the present invention.

FIGS. 7A and 7B are views showing a structure of an optical communication module according to a fourth embodiment of the present invention. The optical communication module of the present embodiment conducts only the emission of a signal light.

In the present embodiment, by a monitoring light-receiving element 32 provided at the back of the light-emitting element 40, the intensity of a signal light emitted by the light-emitting element 40 is appropriately adjusted. The monitoring light-receiving element 32 is mounted on the surface of an optical waveguide substrate 10c to receive a rear output light of the light-emitting element 40 reflected by the folded mirror 20.

The light-emitting element 40 is mounted on the optical waveguide substrate 10c so as to couple with the optical waveguide 11. The rear output light from the light-emitting element 40 is reflected by the folded mirror 20 toward the side of the surface of the optical waveguide substrate 10c, received by a light-receiving surface 33 of the monitoring light-receiving element 32 and used for the control of the light output of the light-emitting element 40.

As described in the foregoing, according to the present embodiment, arrangement of the folded mirror 20 and the monitoring light-receiving element 32 at the back of the light-emitting element 40 enables light output of the light-emitting element to be monitored and appropriately controlled.

Figure 8A:
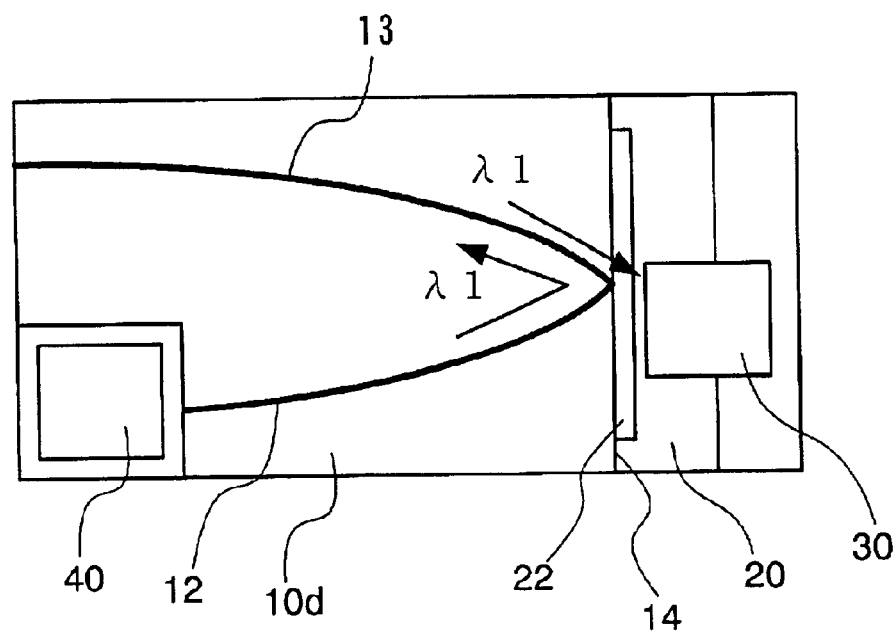
FIG. 8A is a plan view showing a structure of an optical communication module according to a fifth embodiment of the present invention.
Figure 8B:
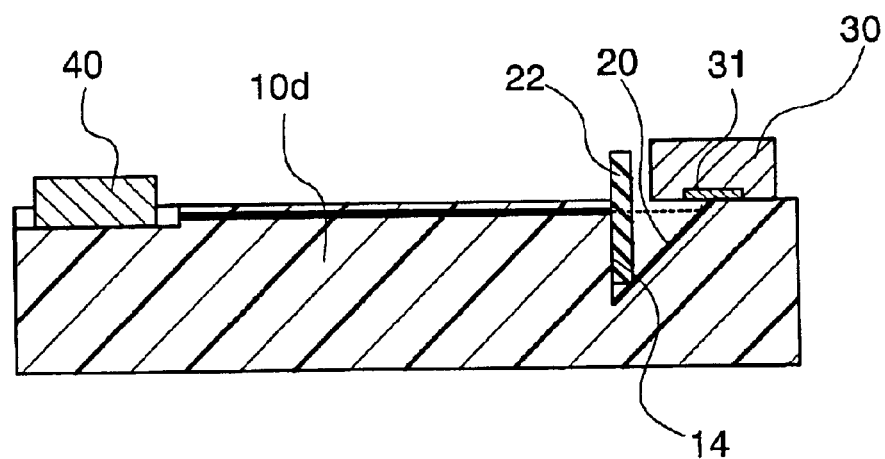
FIG. 8B is a sectional view showing the structure of the optical communication module according to the fifth embodiment of the present invention.

FIGS. 8A and 8B are views showing an optical communication module according to a fifth embodiment of the present invention. The optical communication module of the present embodiment transmits and receives signal lights of the same wavelength ($\lambda 1$).

The present embodiment is characterized in that a half mirror 22 is attached to the waveguide end surface 14 in place of the filter 50 in the second embodiment.

To the half mirror 22, a dielectric multilayer is deposited by evaporation which reflects both of half of a received signal light and half of a transmitted signal light having the same wavelength ($\lambda 1$) and allows the other half of the same to penetrate.

The received signal light of the wavelength of λ1 input through the second optical waveguide 13 (half of the signal) penetrates the half mirror 22, reflected by the folded mirror 20 toward the side of the surface of an optical waveguide substrate 10d and received by the light-receiving surface 31 of the light-receiving element 30.

The transmitted signal light having the wavelength of λ1 emitted from the light-emitting element 40 is guided through the first optical waveguide 12, reflected (half of the signal) by the half mirror 22 to couple with the second optical waveguide 13 and led to a transmission path.

The light-receiving element 30 is arranged on the extension of the second optical waveguide 13, which is a position for coupling with a received signal light incident from the second optical waveguide 13, and at a position off the extension of the first optical waveguide 12. This arrangement prevents reception of the transmitted signal light penetrating the half mirror 22 by the light-receiving element 30.

As described in the foregoing, attachment of the half mirror 22 to the waveguide end surface 14 enables transmission and reception of signal lights of the same wavelength in the present embodiment.

Figure 9A:
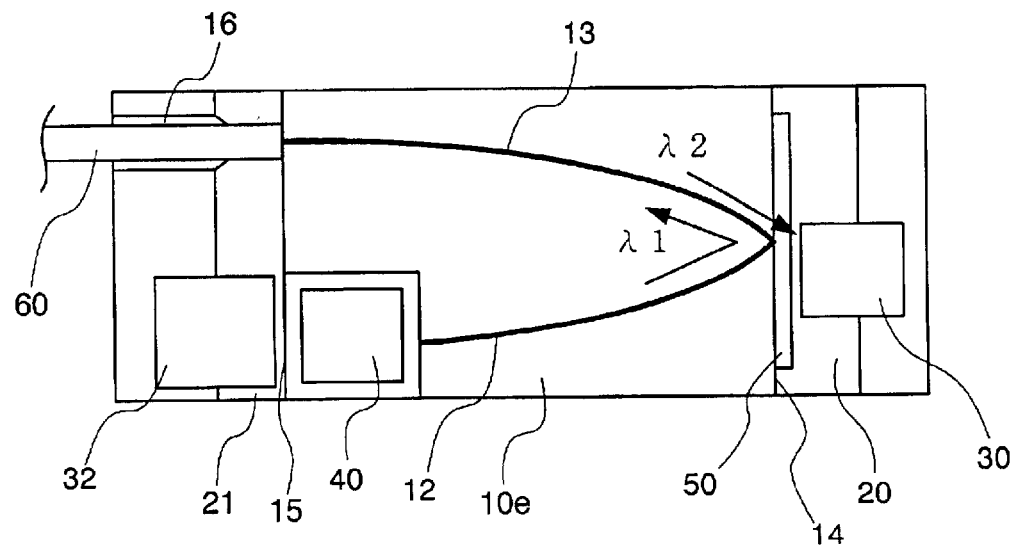
FIG. 9A is a plan view showing a structure of an optical communication module according to a sixth embodiment of the present invention.
Figure 9B:
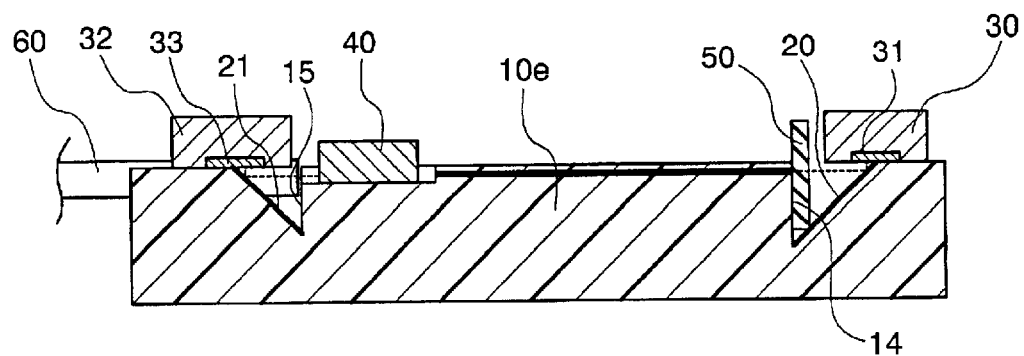
FIG. 9B is a sectional view showing the structure of the optical communication module according to the sixth embodiment of the present invention.
Figure 10:
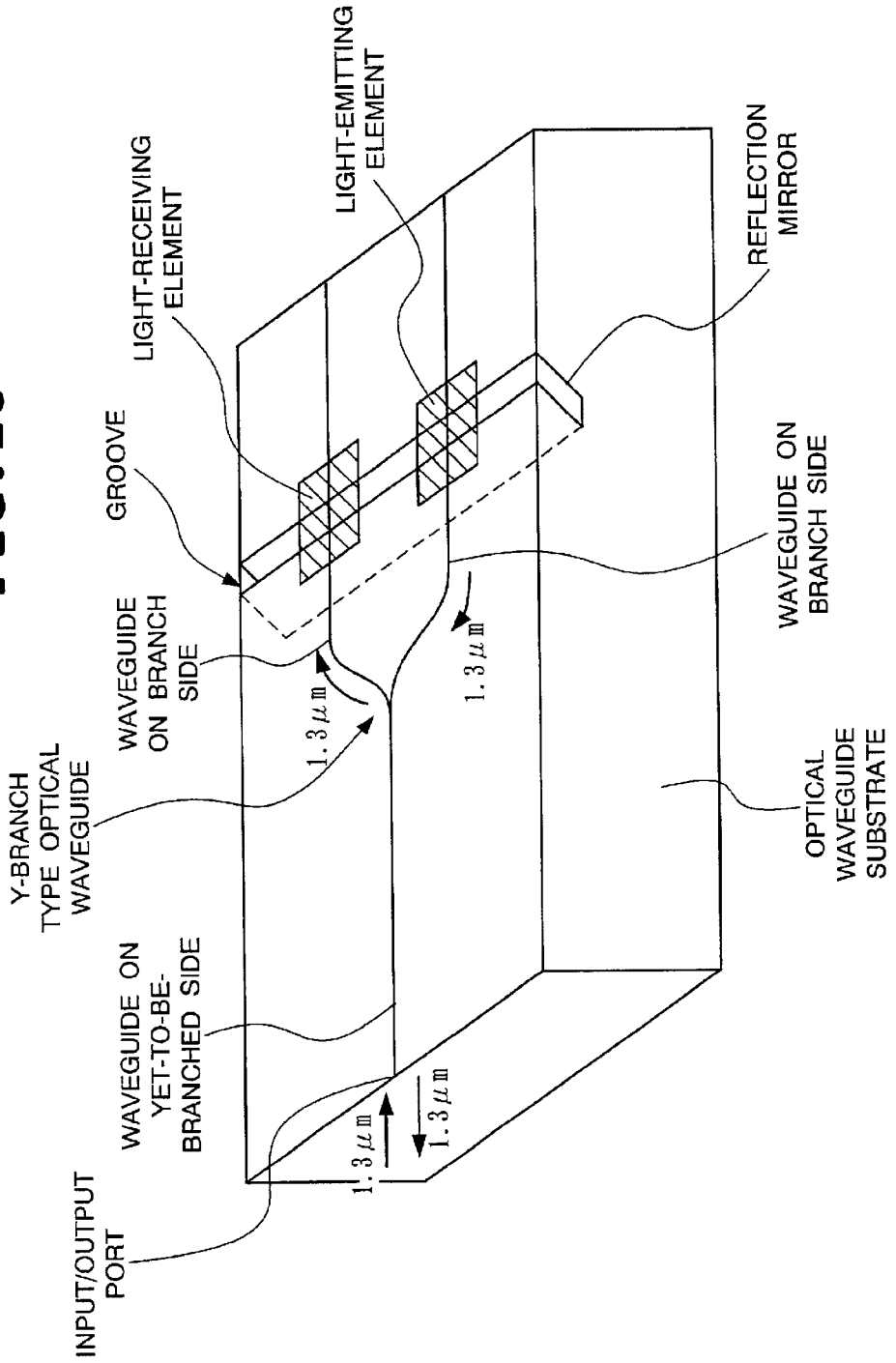
FIG. 10 is a view showing one example of a structure of a conventional optical communication module.
Figure 11:
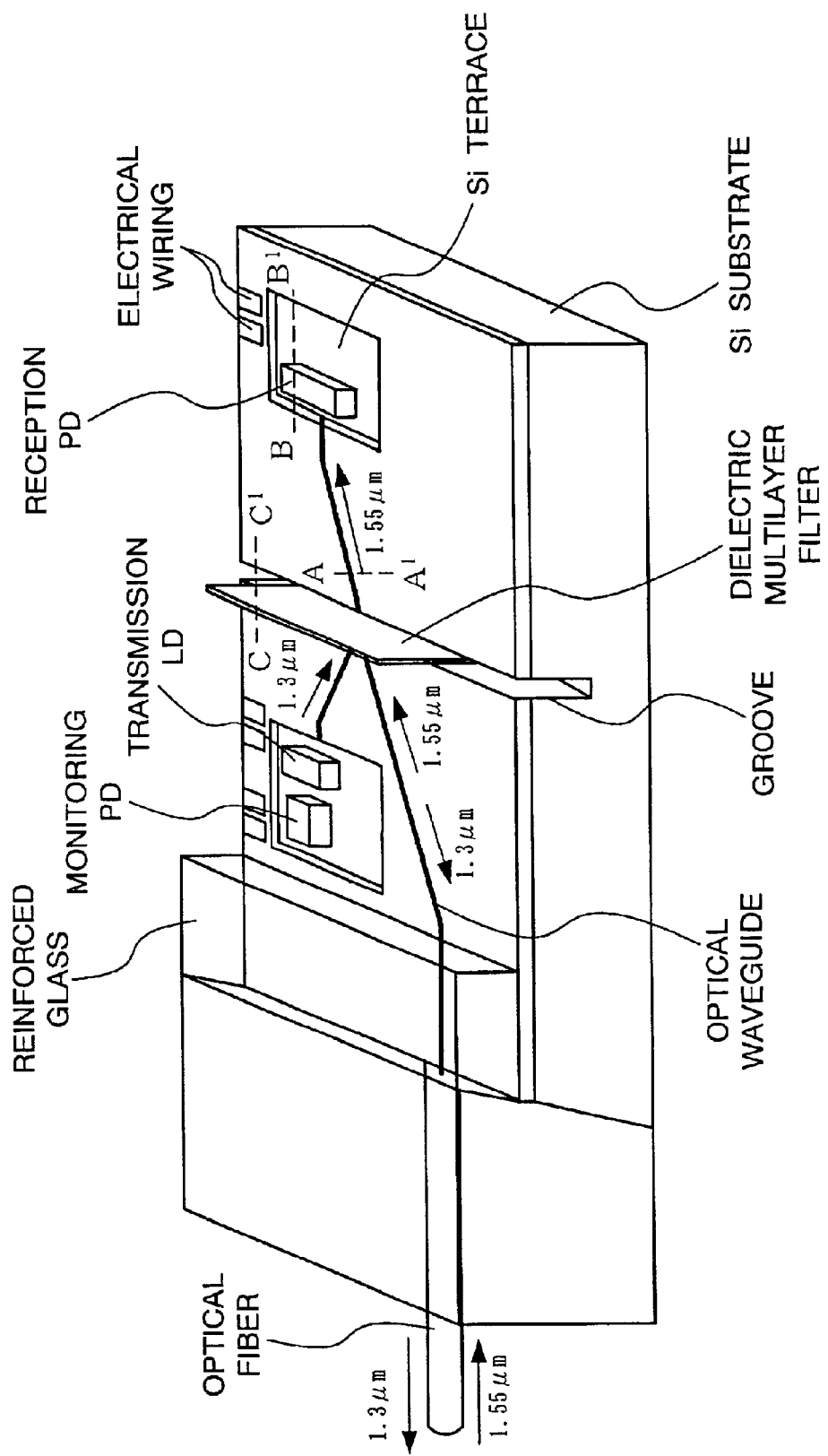
FIG. 11 is a view showing one example of a structure of a conventional optical communication module.
Figure 12:
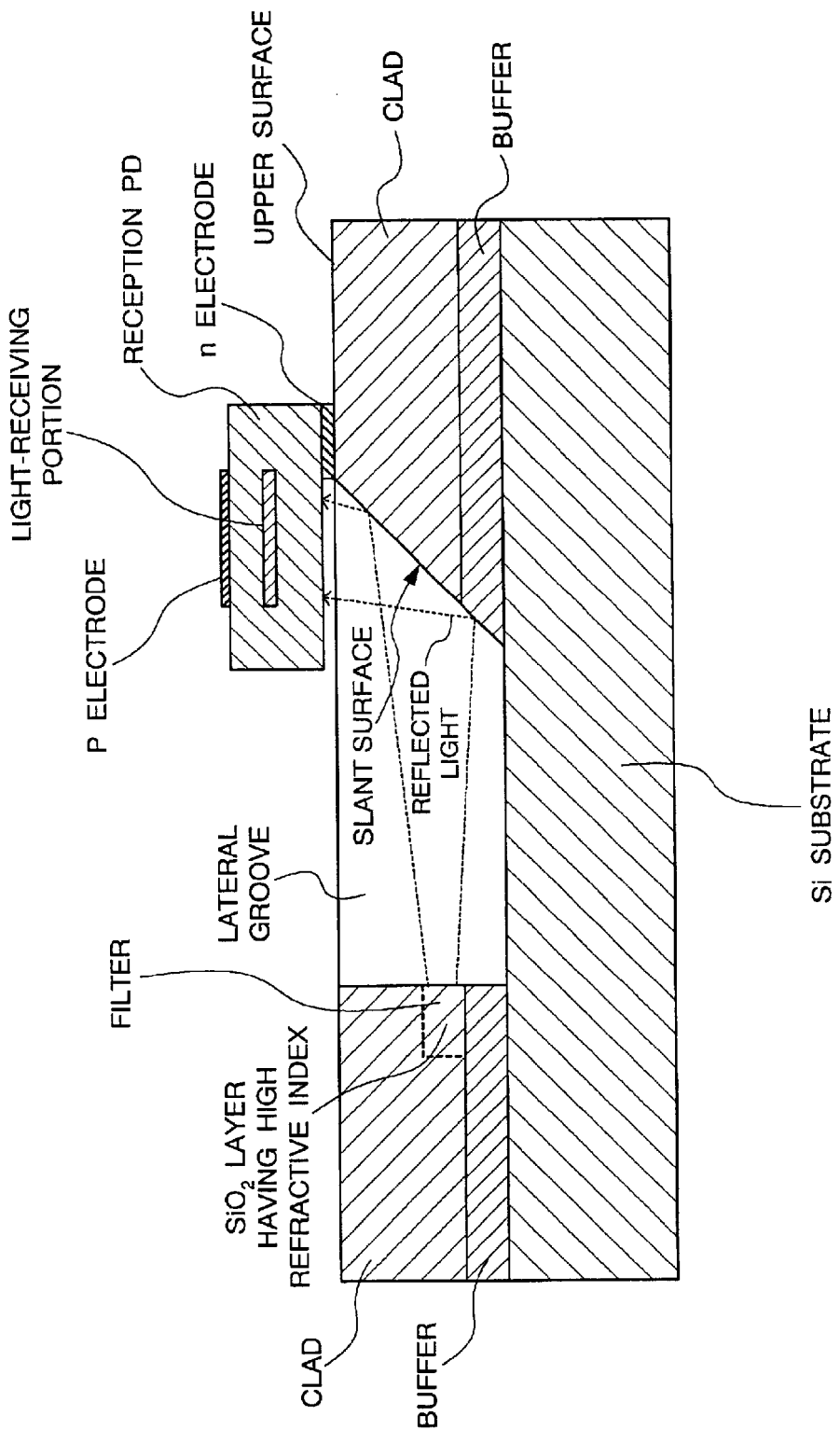
FIG. 12 is a view showing one example of a structure of a conventional optical communication module.

FIGS. 9A and 9B are views showing a structure of an optical communication module according to a sixth embodiment of the present invention. The optical communication module of the present embodiment transmits and receives signal lights of different wavelengths.

The present embodiment differs from the second embodiment in that at the back of the light-emitting element 40, the monitoring light-receiving element 32 is arranged to control the output of the light-emitting element 40 similarly to the fourth embodiment and in that a V-shaped groove 16 for fiber guide is formed at the outlet portion of the second optical waveguide 13 on the transmission side and a fiber 60 is arranged in the groove.

The present embodiment thus includes two groove portions having folded mirrors 20 and 21, a first groove portion on the side of the light-emitting element 40 being the same as that of the fourth embodiment shown in FIGS. 6A and 6B and a second groove portion on the side of the light-receiving element 30 being the same as that of the second embodiment shown in FIGS. 2A and 2B.

The folded mirror 21 provided on the side of the light-emitting element 40 reflects a rear output light from the light-emitting element 40 to make the same be incident on the light-receiving surface 33 of the monitoring light-receiving element 32 disposed on the side of the surface of an optical waveguide substrate 10e.

The folded mirror 21 provided on the side of the light-emitting element 40 can be manufactured in the same manner as that of the folded mirror 20 on the side of the light-receiving element 30 and can be formed by cutting the substrate slantwise as illustrated in FIGS. 9A and 9B and then metallizing the surface with a metal film such as Au.

At the outlet portion of the optical waveguide 11 on the side of the transmission path, the fiber 60 is arranged so as to couple with the second optical waveguide 13. Positioning of the fiber 60 in a direction vertical to an optical axis can be made by the V-shaped groove 16 formed in the optical waveguide substrate 10e and that in the direction of the optical axis can be made by sticking the tip of the fiber 60 on the waveguide end surface 15, so that the fiber can be mounted on the optical waveguide substrate without adjustment of the optical axis.

A received signal light (wavelength of λ2) incident from the fiber 60 penetrates the filter 50, is reflected by the folded mirror 20 toward the side of the surface of the optical waveguide substrate 10e and received by the light-receiving surface 31 of the light-receiving element 30.

A transmitted signal light (wavelength of λ1) emitted from the light-emitting element 40 is guided through the first optical waveguide 12, reflected by the filter 50, guided through the second optical waveguide 13 and the fiber 60 and led to the transmission path.

After being reflected toward the side of the surface of the optical waveguide substrate 10e by the folded mirror 21, a rear output light from the light-emitting element 40 is received by the light-receiving surface 33 of the monitoring light-receiving element 32 and used for the control of the light output of the light-emitting element 40.

As described in the foregoing, the present embodiment produces an effect, in addition to the effect attained by the second embodiment, that a light output of the light-emitting element 40 can be monitored because the monitoring light-receiving element 32 is arranged at the back of the light-emitting element 40. Moreover, because the fiber 60 is arranged at the V-shaped groove 16 for fiber guide formed at the outlet portion of the second optical waveguide 13 on the transmission path side, the fiber 60 can be mounted on the optical waveguide substrate without adjustment of an optical axis.

In addition, the above-described embodiments can be realized also in various combinations.

Although the present invention has been described with respect to the preferred modes and embodiments in the foregoing, the present invention is not limited to those described above and can be variously modified for implementation within the scope of its technical ideas.

As described in the foregoing, the optical communication module according to the present invention attains the following effects.

First, the number of parts and assembly steps of an optical communication module are reduced to realize reduction in optical communication module production costs.

The optical communication module of the present invention employs not a structure in which a mirror is inserted into a groove formed in an optical waveguide substrate but a structure in which a folded mirror to be coupled with a light-receiving element is formed directly on an optical waveguide substrate, whereby insertion of a mirror is unnecessary to reduce the number of parts and assembly steps. In particular, since none of laborious work for inserting a mirror is required, drastic reduction in assembly costs is possible. In addition, as a light-receiving element, inexpensive surface-incident light-receiving element can be used and furthermore, automation of a mounting process of mounting a mirror on the surface of an optical waveguide substrate is easy to realize drastic cost reduction and mass production.

Secondly, mounting of a filter which allows a signal light to penetrate or reflects the same according to its wavelength on an optical communication module is facilitated.

In the optical communication module of the present invention, since a shape of a groove at a folded mirror portion is triangle and a width of the same becomes larger as the depth becomes smaller, filter mounting work is easy. Laborious work has been conventionally required for inserting a filter into a narrow groove.

Thirdly, because of a structure in which a filter is attached to a waveguide end surface, the filter can be mounted so as not to slant relative to the waveguide end surface.

Fourthly, since a filter can be made thick because a width of a groove is large, a filter using a substrate of such a hard material as glass can be used, whereby workability of a filter attachment process can be improved and reduction of assembly costs and mass production can be realized through automation of the filter attachment process.

Fifthly, because of metallization of a slant surface which reflects a signal light, the communication module of the present invention attains sufficient reflection of a signal light even when a groove portion is covered with transparent resins, thereby allowing various kinds of packaging methods using transparent resins to be selected.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An optical communication module for communicating a light signal, comprising:
    a groove portion comprising a V-shaped section and being formed on a surface of an optical waveguide substrate,
    wherein on one of two surfaces of said groove portion, a mirror is formed to reflect a light incident from a side of the other surface and make the light be incident on a light-receiving element disposed on the surface of said optical waveguide substrate;
    said optical communication module further comprising:
    a tip of an optical waveguide on the optical waveguide substrate provided in a vicinity of the surface of said groove portion at a side from which a light is incident onto said mirror,
    wherein said mirror reflects a signal light guided by said optical waveguide so as to be incident onto the light-receiving element, and
    on the surface of said groove portion at the side from which a light is incident onto said mirror,
    a filter which allows a signal light, having a wavelength of a received signal light incident from said optical waveguide to penetrate and fails to allow a noise light having a wavelength different from the wavelength of said received signal light to penetrate is disposed slantwise with respect to said optical waveguide.

2. An optical communication module for communicating a light signal, comprising:
    a groove portion comprising a V-shaped section and being formed on a surface of an optical waveguide substrate,
    wherein on one of two surfaces of said groove portion, a mirror is formed to reflect a light incident from a side of the other surface and make the light be incident on a light-receiving element disposed on the surface of said optical waveguide substrate;
    said optical communication module further comprising:
    a tip of an optical waveguide on the optical waveguide substrate provided in a vicinity of the surface of said groove portion at a side from which a light is incident onto said mirror,
    wherein said mirror comprises the one surface of said groove portion being coated with a metal film to reflect a signal light guided by said optical waveguide so as to be incident onto the light-receiving element, and
    on the surface of said groove portion at the side from which a light is incident onto said minor,
    a filter which allows a signal light having a wavelength of a received signal light incident from said optical waveguide to penetrate and fails to allow a noise light having a wavelength different from the wavelength of said received signal light to penetrate is disposed slantwise with respect to said optical waveguide.

3. An optical communication module for communicating a light signal, comprising:
    a groove portion comprising a V-shaped section and being formed on a surface of an optical waveguide substrate,
    wherein on one of two surfaces of said groove portion, a mirror is formed to reflect a light incident from a side of the other surface and make the light be incident on a light-receiving element disposed on the surface of said optical waveguide substrate;
    said optical communication module further comprising:
    in a vicinity of the surface of said groove portion at a side from which a light is incident onto said mirror, a tip of a first optical waveguide for guiding a transmitted signal light and a tip of a second optical waveguide for guiding a received signal light and guiding said transmitted signal light reflected at said groove portion, whereby
    the received signal light guided by said second optical waveguide is reflected to be incident onto the light-receiving element.

4. The optical communication module as set forth in claim 3, wherein said mirror comprises the one surface of said groove portion being coated with a metal film.

5. The optical communication module as set forth in claim 3, further comprising:
    on the surface of said groove portion at the side from which a light is incident onto said mirror.
    a filter which allows a signal light having a wavelength of said received signal light to penetrate and reflects a signal light having a wavelength of said transmitted signal light is disposed.

6. The optical communication module as set forth in claim 3, wherein said mirror comprises the one surface of said groove portion being coated with a metal film, and
    wherein said optical communication module further comprises:
    on the surface of said groove portion at the side from which a light is incident onto said mirror,
    a filter which allows a signal light having a wavelength of said received signal light to penetrate and reflects a signal light having a wavelength of said transmitted signal light is disposed.

7. The optical communication module as set forth in claim 3, further comprising:
    on the surface of said groove portion at the side from which a light is incident onto said mirror,
    a half mirror which reflects an incident signal light and allows the light to penetrate,
    wherein said light-receiving element is disposed at a position where a received signal light incident from said first optical waveguide, penetrating said half mirror and reflected by said mirror can be received and where a transmitted signal light incident from said second optical waveguide, penetrating said half mirror and reflected by said mirror can be avoided.

8. The optical communication module as set forth in claim 3, wherein said mirror comprises the one surface of said groove portion being coated with a metal film, and wherein said optical communication module further comprises:

on the surface of said groove portion at the side from which a light is incident onto said mirror, a half mirror which reflects an incident signal light and allows the light to penetrate, wherein said light-receiving element is disposed at a position where a received signal light incident from said first optical waveguide, penetrating said half mirror and reflected by said mirror can be received and where a transmitted signal light incident from said second optical waveguide, penetrating said half mirror and reflected by said mirror can be avoided.

9. The optical communication module as set forth in claim 3, further comprising:

two portions of said groove portion on said optical waveguide substrate, a first groove portion and a second groove portion, wherein said first groove portion reflects a rear output light of a light-emitting element for emitting said transmitted signal light by the internally provided mirror to make the light be incident onto a monitoring light-receiving element for monitoring an output light of said light-emitting element, and said second groove portion reflects said received signal light by the internally provided mirror to make the light be incident onto said light-receiving element for receiving said received signal light.

10. The optical communication module as set forth in claim 3, wherein said mirror comprises the one surface of said groove portion being coated with a metal film, and said optical communication module further comprises:

two portions of said groove portion on said optical waveguide substrate, a first groove portion and a second groove portion, wherein said first groove portion reflects a rear output light of a light-emitting element for emitting said transmitted signal light by the internally provided minor to make the light be incident onto a monitoring light-receiving element for monitoring an output of said light-emitting element, and said second groove portion reflects said received signal light by the internally provided mirror to make the light be incident onto said light-receiving element for receiving said received signal light.

11. A method of manufacturing an optical communication module for communicating a light signal, comprising:

forming an optical waveguide for guiding a light signal on an optical waveguide substrate, forming a groove portion comprising a V shaped section on a surface of the optical waveguide substrate, and forming a minor on one of two surfaces of said groove portion, wherein at said groove portion forming, first, one of the two surfaces of said groove portion is formed on the surface of said optical waveguide substrate using a blade for cutting and the remaining surface is subsequently formed to make said groove portion.

12. The optical communication module manufacturing method as set forth in claim 11, wherein at said mirror forming, the one surface of said groove portion is formed by coating the surface with a metal film.

13. The optical communication module manufacturing method as set forth in claim 11, wherein at said groove portion forming, a first surface is formed by vertically inserting said blade into the surface of said optical waveguide substrate and a slant surface forming said mirror, which is the remaining surface, is subsequently formed by inserting said blade slantwise into the surface of said optical waveguide substrate.

14. The optical communication module manufacturing method as set forth in claim 11, wherein at said mirror forming, the one surface of said groove portion is formed by coating the surface with a metal film, and at said groove portion forming, a first surface is formed by vertically inserting said blade into the surface of said optical waveguide substrate and a slant surface for forming said mirror, which is the remaining surface, is subsequently formed by inserting said blade slantwise into the surface of said optical waveguide substrate.

15. The optical communication module manufacturing method as set forth in claim 11, wherein at said groove portion forming, by using said blade with respect to said optical waveguide substrate being yet to be cut out from a wafer, forming said groove portions in a lump in a plurality of said optical waveguide substrates aligned on said wafer.

16. The optical communication module manufacturing method as set forth in claim 11, wherein at said mirror forming, forming the one surface of said groove portion by coating the surface with a metal film, and at said groove portion forming, by using said blade with respect to said optical waveguide substrate yet to be cut out from a wafer, forming said groove portions in a lump in a plurality of said optical waveguide substrates aligned on said wafer.

17. A method of manufacturing an optical communication module for communicating a light signal, comprising:

forming an optical waveguide for guiding a light signal on an optical waveguide substrate, forming a groove portion comprising a V shaped section on a surface of the optical waveguide substrate, and forming a mirror on one of two surfaces of said groove portion, wherein at said groove portion forming, the two surfaces of said groove portion are simultaneously formed by cutting the surfaces out of said optical waveguide substrate using a blade for cutting that substantially corresponds to the configuration of said groove portion.

18. The optical communication module manufacturing method as set forth in claim 17, wherein at said mirror forming, the one surface of said groove portion is formed by coating the surface with a metal film.

19. A method of manufacturing an optical communication module for communicating a light signal, comprising:

forming an optical waveguide for guiding a light signal on an optical waveguide substrate, forming a groove portion extending in a direction transverse to a direction of said light signal, said groove portion comprising a V shaped section on a surface of the optical waveguide substrate, and forming a mirror on one of two surfaces of that said groove portion, wherein said mirror forming comprises:

forming the one surface of said groove portion by coating the surface with a metal film, and forming two of said groove portions in said optical waveguide substrate, wherein said two of said groove portions comprises a first groove portion for monitoring an output of a transmitted signal light and a second groove portion for receiving a received signal light.

20. An optical communication module for communicating a light signal, comprising:

a groove portion extending in a direction transverse to a direction of said light signal, comprising a V-shaped section and being formed on a surface of an optical waveguide substrate, wherein on one of two surfaces of said groove portion, a mirror is formed to reflect a light incident from a side of the other surface and make the light be incident an a light-receiving element disposed on the surface of said optical waveguide substrate; and a filter that allows a signal light having a wavelength of a received signal light incident from said optical waveguide to penetrate and does not allow a noise light having a wavelength different from the wavelength of said received signal light to penetrate, wherein said filter is disposed vertically with respect to said optical waveguide.

* * * * *